(12) United States Patent
Mitterreiter

(10) Patent No.: US 6,194,710 B1
(45) Date of Patent: Feb. 27, 2001

(54) PREMOUNTED ANGLE MEASURING DEVICE HAVING FIXATION ELEMENT

(75) Inventor: Johann Mitterreiter, Chieming (DE)

(73) Assignee: Dr. Johannes Heidenhain GmbH, Traunrent (DE)

(*) Notice: Subject to any disclaimer, the term of this patent is extended or adjusted under 35 U.S.C. 154(b) by 0 days.

(21) Appl. No.: 09/286,404

(22) Filed: Apr. 5, 1999

(30) Foreign Application Priority Data

Apr. 16, 1998 (DE) .............................................. 198 16 827

(51) Int. Cl.⁷ ........................................................ G01D 5/34
(52) U.S. Cl. .......................................... 250/231.14; 341/13
(58) Field of Search ......................... 250/231.13–231.18; 341/13, 31; 356/375

(56) References Cited

U.S. PATENT DOCUMENTS

| | | |
|---|---|---|
| 4,070,759 | 1/1978 | Nelle . |
| 4,320,578 | 3/1982 | Ernst . |
| 4,413,416 | 11/1983 | Ernst . |
| 4,495,700 | 1/1985 | Ernst . |
| 4,509,262 | 4/1985 | Nelle . |
| 4,530,159 | 7/1985 | Ernst . |
| 4,556,792 | 12/1985 | Kano et al. . |
| 4,639,595 | 1/1987 | Okita et al. . |
| 4,660,288 | 4/1987 | Dangschat . |
| 4,663,851 | 5/1987 | Feichtinger . |
| 4,794,250 | 12/1988 | Togami . |
| 4,942,295 | 7/1990 | Brunner et al. . |
| 5,057,684 | 10/1991 | Service . |
| 5,155,401 | * 10/1992 | Kanaya et al. ................... 250/231.13 |
| 6,096,989 | * 8/2000 | Kinoshita ............................ 200/345 |

FOREIGN PATENT DOCUMENTS

| | | |
|---|---|---|
| 37 40 744 | 6/1988 | (DE) . |
| 0 280 390 | 8/1988 | (EP) . |
| 0 353 395 | 2/1990 | (EP) . |
| 0 557 564 | 9/1993 | (EP) . |

OTHER PUBLICATIONS

Pending Patent Application No. 09/354,047, Inventor: Mitterreiter, Filing Date: Jul. 15, 1999—to be assigned to Johannes Heidenhain GmbH.

Pending Patent Application No.—Unassigned (attorney docket No. 56/327), Inventor: Michel et al., Filing Date: Jul. 30, 1999—to be assigned to Johannes Heidenhain GmbH.

\* cited by examiner

*Primary Examiner*—Stephone B. Allen
(74) *Attorney, Agent, or Firm*—Brinks Hofer Gilson and Lione

(57) ABSTRACT

An angle measuring device for measuring the angular position of two objects, which can be rotated in respect to each other. The device includes a graduated disk with a graduation and fastened on a hub. A scanning mechanism to scan the graduated disk and a fixation element including an axially extending projection of the hub, which is rigid in the axial direction and elastically resilient in the radial direction so as to fix the axial position relation between the graduated disk and the scanning mechanism, wherein the projection exists in a position of rest where the projection does not contact the scanning mechanism. A pressure element that displaces the projection from the position of rest to a clamping position where the projection clamps the scanning mechanism.

10 Claims, 4 Drawing Sheets

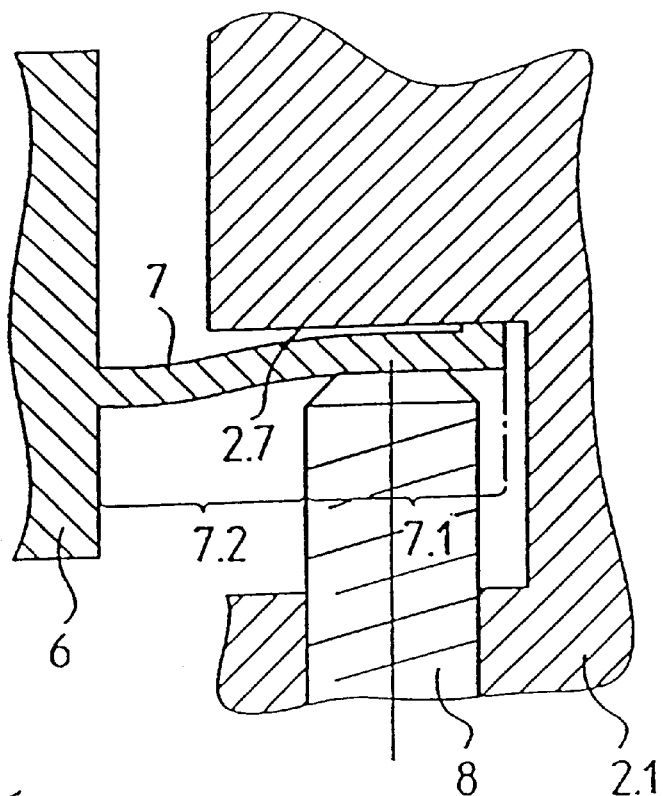
Fig. 3
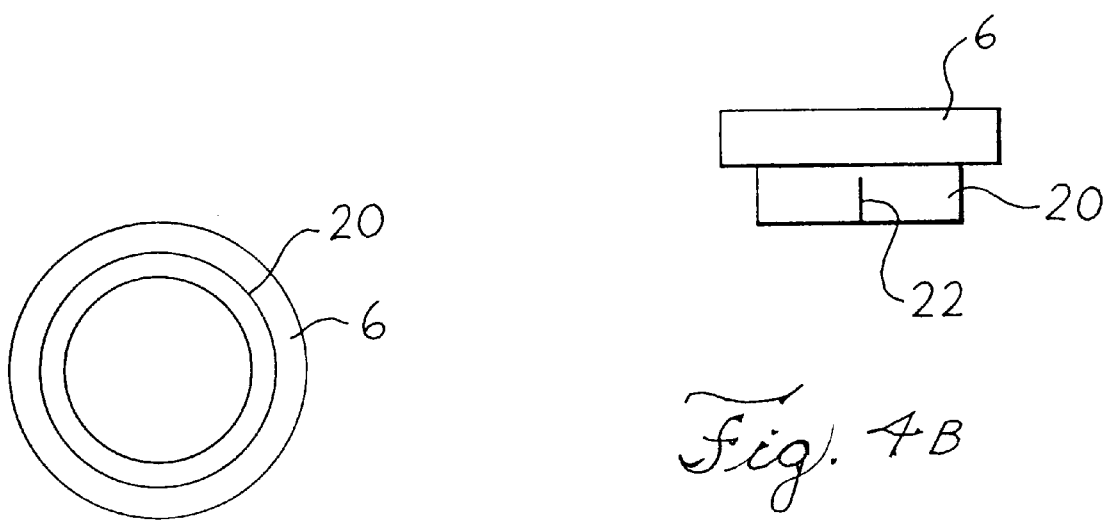
Fig. 4A
Fig. 4B

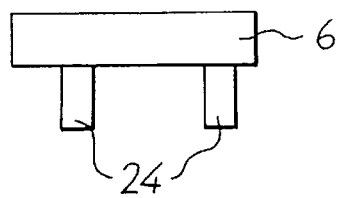
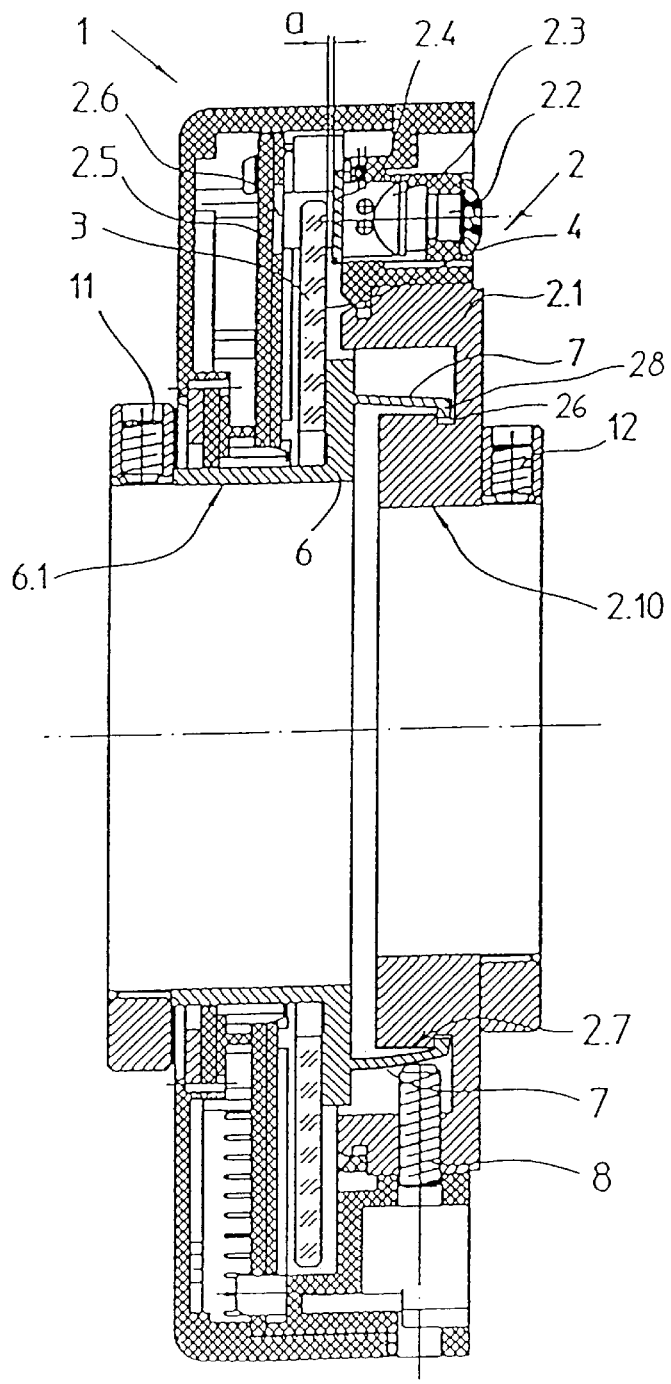
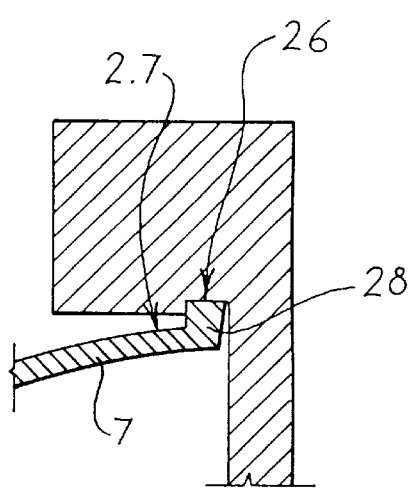

PREMOUNTED ANGLE MEASURING DEVICE HAVING FIXATION ELEMENT

Applicant claims, under 35 U.S.C. § 119, the benefit of priority of the filing date of Apr. 16, 1998 of a German patent application, copy attached, Ser. No. 198 16 827.6, filed on the aforementioned date, the entire contents of which is incorporated herein by reference.

BACKGROUND OF THE INVENTION

1. Field of the Invention

The present invention relates to an angle measuring device for measuring the angular position of two objects, which can be rotated in respect to each other.

2. Discussion of Related Art

Such angle measuring devices are also called "built-in angle encoders", which do not have their own seating.

Fixation elements, which fix the correlation between the graduation support and the scanning mechanism during installation in order to make the attachment of these angle measuring devices easier are known, for example, from U.S. Pat. No. 4,639,595, U.S. Pat. No. 4,556,792, DE 37 40 744 A1, U.S. Pat. No. 5,057,684, EP 0 280 390 A1, EP 0 353 395 B1 and EP 0 557 564 B1.

In these cases the fixation element as a rule consists of a separate component, for which attachment surfaces as the locating surfaces are provided on the scanning mechanism and on the hub or graduated disk.

In connection with the angle measuring device in accordance with FIG. 7 of EP 0 353 395 B1, the fixation element consists of resilient tongues, which are formed as one piece on the stationary scanning mechanism and extend around the hub.

The elaborate production of these known angle measuring devices is disadvantageous.

SUMMARY OF THE INVENTION

One aspect of the present invention regards an angle measuring device for measuring the angular position of two objects, which can be rotated in respect to each other. The device includes a graduated disk with a graduation and fastened on a hub. A scanning mechanism to scan the graduated disk and a fixation element including an axially extending projection of the hub, which is rigid in the axial direction and elastically resilient in the radial direction so as to fix the axial position relation between the graduated disk and the scanning mechanism, wherein the projection exists in a position of rest where the projection does not contact the scanning mechanism. A pressure element that displaces the projection from the position of rest to a clamping position where the projection clamps the scanning mechanism.

One advantage and object of the present invention is to provide an angle measuring device wherein the required correlation between the graduation support and the scanning mechanism is already preset by the manufacturer of the measuring device in a simple manner, and which can be easily produced.

Further objects, advantages and details of the scanning element according to the invention will become apparent from the ensuing description of an exemplary embodiment in conjunction with the accompanying drawings.

BRIEF DESCRIPTION OF THE DRAWINGS

FIG. 3 represents an enlarged portion of the angle measuring device shown in FIG. 1;

FIG. 4A shows a front view of an embodiment of a projection to be used with the angle measuring device of FIGS. 1–3;

FIG. 4B shows a top view of the projection of FIG. 4A;

FIG. 5 shows a top view of a second embodiment of a projection to be used with the angle measuring device of FIGS. 1–3;

FIG. 6A shows a longitudinal section of the angle measuring device of FIGS. 1–3 in the preassembled state and employing an axially acting stop; and FIG. 6B shows an enlarged view of the dashed circular area of FIG. 6A.

DESCRIPTION OF THE PREFERRED EMBODIMENT

Figure 1:
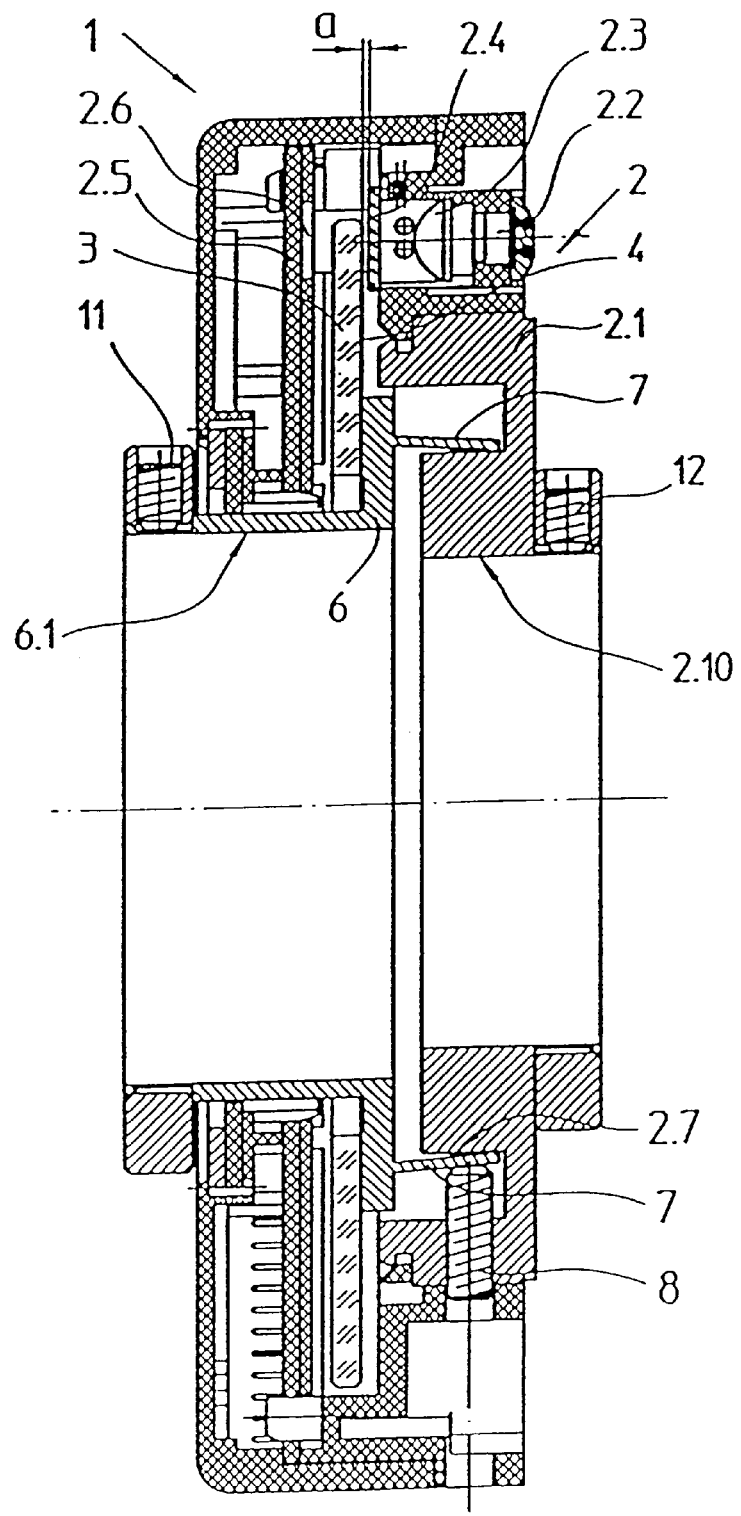
FIG. 1 represents an axial longitudinal section through an angle measuring device according to the present invention in the premounted state.
Figure 2:
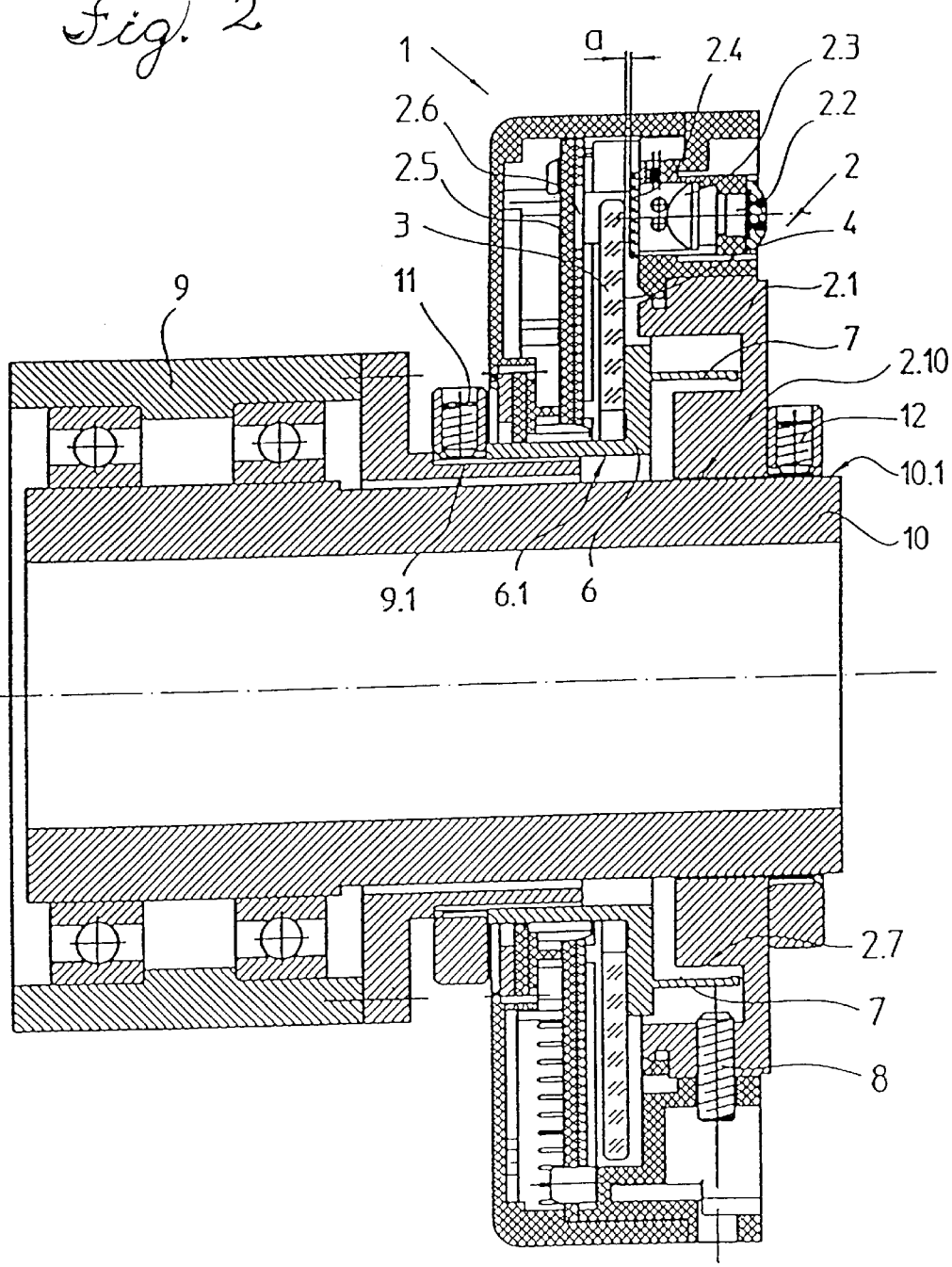
FIG. 2 represents a longitudinal section of the angle measuring device in FIG. 1 in the attached state.

The angle measuring device 1 in FIGS. 1 to 3 includes in a known manner of a stationary scanning mechanism 2 and a graduation support in the form of a disk 3 with a graduation 4. The scanning mechanism 2 includes a support 2.1, a light source 2.2, a condenser 2.3, a scanning plate 2.4 and a board 2.5 with photodetectors 2.6. The graduation 4 is scanned in accordance with the transmitted light method. The electrical scanning signals of the photodetectors 2.6 are conducted via a conductor, not represented, to an electronic follow-up device, for example a counter or a numerical control.

The graduated disk 3 is fastened on a hub 6. In accordance with the invention, a fixation element or projection 7 is provided on this hub 6, which fixes the radial and axial correlation between the graduated disk 3 and the scanning mechanism 2 in the premounted state. The fixation element 7 is an axially extending projection formed on the hub 6. The projection 7 is designed to be rigid in the axial direction and elastically resilient in the radial direction. Since as a rule the hub 6 is a rotating element made of metal, the projection 7 can be produced in a simple manner by turning on a lathe. The projection 7 is designed to be dynamically balanced.

Premounting at the manufacturer of the angle measuring device 1 takes place in an arrangement, by means of which the axial scanning distance "a" between the graduated disk 3 and the scanning mechanism 2 is set. In this predetermined position, the projection 7 is pressed against a stop face 2.7 by a screw 8, by means of which a radial clamping of the projection 7 with the stop face 2.7 of the scanning mechanism 2 is achieved. The axial scanning distance "a" between the graduated disk 3 and the scanning mechanism 2 for subsequent transportation to the user as well as for mounting on the objects 9, 10 to be measured is fixed by this clamping in the predetermined position. In the example, clamping is provided by means of screws, which are evenly distributed over the circumference, only one screw 8 of which is represented, in that the screws 8 press areas 7.1 of the projection 7 against the stop face 2.7.

In the clamped state, the projection 7 only roughly fixes the radial correlation between the graduated disk 3 and the scanning mechanism 2. The area 7.2 of the projection 7 is used as a radially elastic hinge. Thus, only radial pre-centering is provided by clamping. The exact radial correlation results during the attachment to the shafts 9 and 10 represented in FIG. 2. The exterior diameter of the shaft 9 is a fit for the interior diameter 6.1 of the hub 6. The exterior diameter 10.1 of the shaft 10 is a fit for the interior diameter 2.10 of the support 2.1.

The angle measuring device 1 premounted in accordance with FIG. 1, is axially pushed onto the two shafts 9, 10, and the hub 6 is connected in a torsion-proof manner with the shaft 9 clamped by means of the screw 11. In the same way the scanning mechanism 2 is connected by means of the screw 12 with the shaft 10 in a torsion-proof clamped manner. The exact radial correlation between the scanning mechanism 2 and the graduated disk 3 is achieved only with this installation. The chance for over defining is reduced, since the scanning mechanism 2 can adapt itself to the radial installation position by means of the elastic hinge 7.2, which is predetermined by the shafts 9 and 10.

After installation has taken place, clamping between the projection 7 and the support 2.1 is released in that the screw is turned back radially. The projection 7 springs into its position of rest, by means of which a radial distance between the projection 7 and the stop face 2.7 is achieved. This position which has now been reached is the operating position for the measuring operation, in which the angular position of the shaft 9 in relation to the shaft 10 can be measured extremely exactly by means of the angle measuring device 1.

The invention is not limited to the described opto-electrical angle measuring device, but can also be utilized with inductive, magnetic and capacitive angle measuring devices. The graduation can be made incremental or absolute.

In place of the screw 8, another element exerting pressure on the projection 7 can also be used.

In the simplest case, the projection 7 is a dynamically balanced and radially elastic ring formed on the hub 6. In a manner shown in FIGS. 4 and 5, an axially slit ring 20 with an axial slit 22 (FIGS. 4A–B), or also merely several individual tongues 24 (FIG. 5), can be provided as the projection 7.

For the definite fixation of the axial scanning distance "a", an axially acting stop, for example in the form of a groove 26 can be provided on the stop face 2.7 which cooperates in the premounted state with a protrusion 28 of the projection 7 pointing in the radial direction as shown in FIGS. 6A and 6B.

Other radially or axially acting clamping elements can also be employed, in place of the screws 11, 12, for installing the scanning mechanism 2 and the hub 6 on the object 9, 10 to be measured.

The advantages of the invention are particularly clear with the represented example having the shafts 9, 10, however, in place of the exterior diameters 9.1 and 10.1 of the shafts 9 and 10, inner surfaces of a tube can also be used as installation surfaces, which are used as fit for the angle measuring device to be mounted and which predetermine the exact centering between the graduated disk 3 and the scanning mechanism.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. An angle measuring device for measuring the angular position of two objects, which can be rotated in respect to each other, the device comprising:

a graduated disk fastened on a hub, wherein the graduated disk comprises a graduation;

a scanning mechanism to scan said graduated disk;

a fixation element comprising an axially extending projection of the hub, which is rigid in the axial direction and elastically resilient in the radial direction so as to fix the axial position relation between the graduated disk and the scanning mechanism, wherein the projection exists in a position of rest where the projection does not contact the scanning mechanism; and a pressure element that displaces the projection from the position of rest to a clamping position where the projection clamps the scanning mechanism.

2. The angle measuring device in accordance with claim 1, wherein the projection comprises:

a first area with which the projection is clamped together with the scanning mechanism by the pressure element at the clamping position; and second area located between the hub and the first area, wherein the second area comprises a radially acting hinge that permits radial compensation movements between the hub and the scanning mechanism.

3. The angle measuring device in accordance with claim 2, further comprising:

a shaft with an exterior diameter that is a fit for an interior diameter of the hub; and a shaft with an exterior diameter that is a fit for an interior diameter of the scanning mechanism.

4. The angle measuring device in accordance with claim 1, wherein the pressure element comprises a screw that can be radially displaced in the scanning mechanism.

5. The angle measuring device in accordance with claim 2, wherein the pressure element comprises a screw that can be radially displaced in the scanning mechanism.

6. The angle measuring device in accordance with claim 3, wherein the pressure element comprises a screw that can be radially displaced in the scanning mechanism.

7. The angle measuring device in accordance with claim 1, wherein the projection comprises a dynamically and radially elastic ring formed on the hub.

8. The angle measuring device in accordance with claim 1, wherein the projection comprises a ring with an axial slit.

9. The angle measuring device in accordance with claim 1, wherein the projection comprises at least one tongue.

10. The angle measuring device in accordance with claim 1, wherein the scanning mechanism comprises a groove that receives the projection at the clamping position.

* * * * *